Aug. 9, 1966     H. P. KELLEY, JR     3,265,884
FLOODLIGHT
Filed June 25, 1964
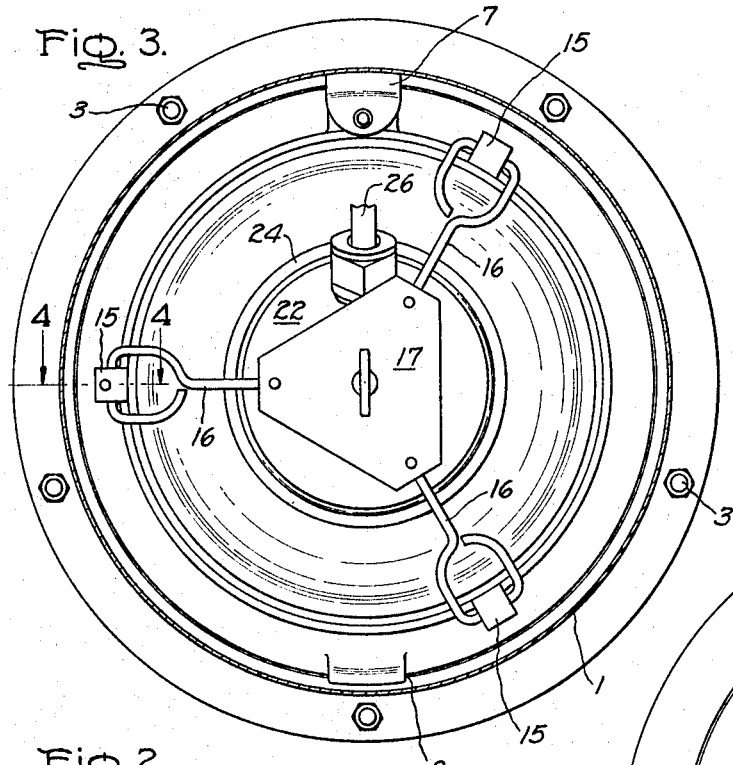
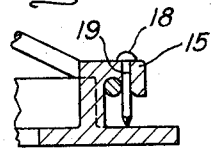
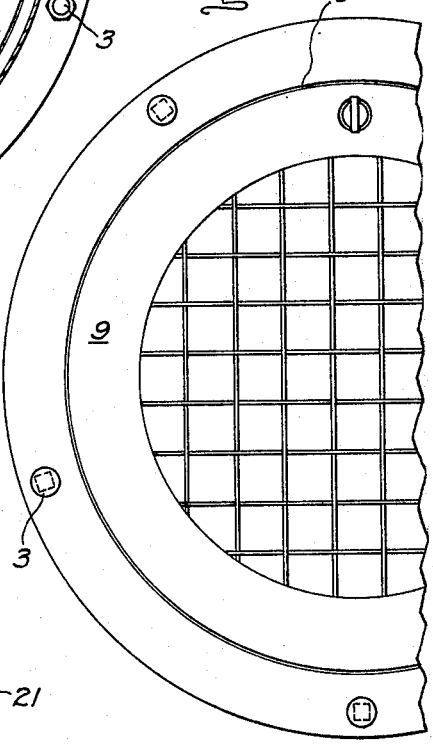
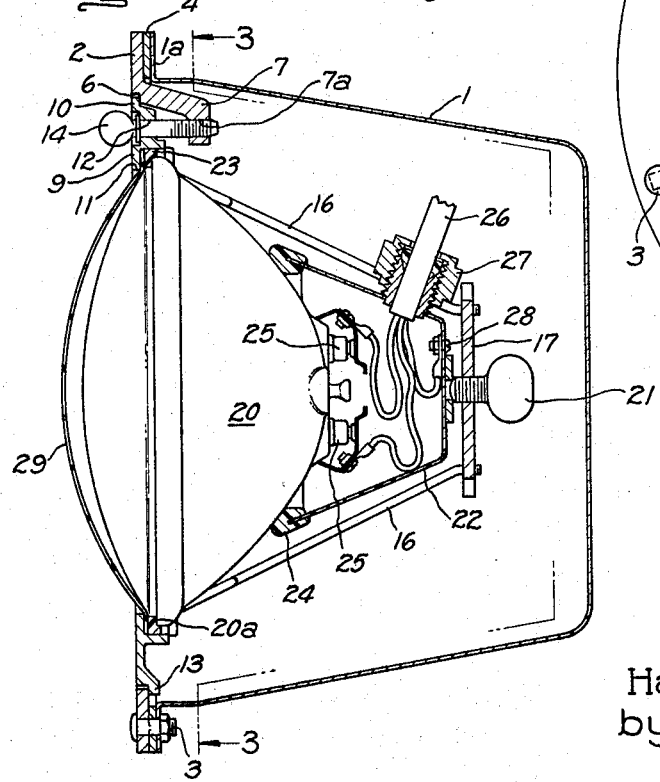
Inventor:
Harold P. Kelley, Jr.
by Henry T. Olsen
His Attorney

United States Patent Office 3,265,884
Patented August 9, 1966

3,265,884
FLOODLIGHT
Harold P. Kelley, Jr., Hendersonville, N.C., assignor to General Electric Company, a corporation of New York
Filed June 25, 1964, Ser. No. 377,974
5 Claims. (Cl. 240—26)

This invention relates to floodlights and more particularly to a water-tight underwater floodlight for use in swimming pools or in exterior areas where intimate contact with water is customarily expected.

It is an object of this invention to provide a floodlight in which the area which must be made water-tight is minimized so as to overcome certain inherent disadvantages in the prior art.

It is another object of this invention to provide a floodlight in which all metal parts which are exposed to contact are intimately connected to ground to minimize shock hazard.

It is a further object of the invention to provide such a floodlight which may be readily assembled and manufactured.

It is a further object of this invention to provide such a floodlight which may be readily relamped and serviced.

Further objects and advantages of the invention shall be apparent from the following description of the preferred embodiment thereof taken in conjunction with the accompanying drawing wherein:

FIG. 1 is a front elevation of an underwater floodlight constructed in accordance with the invention;
FIG. 2 is a section view thereof;
FIG. 3 is a rear sectional view taken on line 3—3 of FIG. 2; and
FIG. 4 is a partial section view on an enlarged scale taken on line 4—4 of FIG. 3.

As shown in FIGS. 1 and 2, the floodlight comprises a housing 1 which is generally bowl-shaped and has an open end closed in part by a cover or face plate 2. The cover plate 2 is secured to the housing 1 by suitable securing means 3 with a gasket 4 interposed between the face plate 2 and a flange 1a of the housing 1. The cover plate 2 has an apertured center 5 with an inwardly extending flange 6 around its inner edge. As best seen in FIG. 2, at one portion thereof the cover plate is provided with a mounting arm 7 having a tapped hole 7a therein.

At a diametrically opposed portion of the cover plate the flange 6 is eliminated with the ends thereof thereby defining a recess 8 (FIG. 3). A mounting ring 9 having a first flange 10 extending outwardly about the mounting ring and an inwardly extending flange 11 has a cored aperture 12 and a hook member 13. The hook member 13 engages in the recess 8 and the mounting plate is then secured in the cover plate by a thumb screw 14 or other means such as a slotted head captive screw which extends through the aperture 12 and threadily engages the tapped hole 7a.

On the inner surface of the mounting ring 9 there is provided three clamp rod hooks 15 which clamp rod hooks are made integrally with the mounting ring 9. Pivotally engaged with the hooks 15 are clamp rods 16 which extend rearwardly in the housing 1 and are threadily engaged, or otherwise secured, in a clamp plate 17. At least one of the clamp rods 16 is held permanently in one of the hooks 15 by a pin 18 (FIG. 4) which is driven through a drilled or cored hole 19 in the outward end of the hook member 15.

A lamp 20 of the sealed beam reflector type is held against the flange 11 of the mounting ring by the pressure of a thumb screw 21 against a terminal cover cone 22 which sealingly engages the reflector back portion of the lamp. A gasket 23 may be interposed between the flange 11 and a lip 20a on the lamp. A water-tight seal between the lamp and the cover cone 22 is provided by a cone gasket 24. The lamp 20 is energized through a pair of terminals 25 by an electric cable 26 which extends outwardly from the cone 22 through a water-tight strain relief connector 27. The cable 26 is of the three conductor type with two of the conductors being connected as shown to the terminals 25 of the lamp and the third conductor, which is a ground conductor, electrically connected to the cone by securing means 28.

A protective grid screen 29 is secured between the gasket 23 and the flange 11 of the mounting ring 9. The protective grid screen 29 has a curvature of smaller radius than the radius of curvature of the face of the lamp so that a minimum of contact therebetween is attained and the screen is in intimate metal-to-metal contact with the mounting ring 9. All of the exposed metal parts of the floodlight including the face plate 2, mounting ring 9 and protective grid screen 29 are in conducting relation to the cone 22 and are thereby grounded through the cable 26.

It will thus be seen that there is provided a floodlight which may be easily assembled and relamped by disengagement of the thumb screw 14 from the mounting arm 7 and removal of the mounting plate 9 from the cover plate 2 by relieving pressure on the cone 22 with the backing off of thumb screw 21. A clamp rod 16 may be disengaged with a hook 15 to remove the lamp from engagement with the mounting ring. It will also be seen that the floodlight provides the advantage that the major electrical connectors, the terminals of the lamp and the ends of the conductor wires, are made water-tight with a minimum of sealing area and it is not necessary that the entire interior of the housing 1 be made water-tight as was conventionally done. Also, all of the metal parts which would be exposed to contact by individuals are intimately grounded through the three-conductor cable.

It will be apparent to one skilled in the art that certain modifications can be made to the preferred embodiment of the invention as herein shown without departing from the inventive concepts disclosed herein.

What is claimed as new and desired to be secured by Letters Patent of the United States is:

1. An underwater floodlight comprising a bowl-shaped housing having an open end, cover plate means having an apertured center secured to said housing with a gasket interposed between said cover plate means and said housing, means for mounting a sealed beam reflector type lamp within said housing including a mounting ring engaged with said apertured center, a protective grid screen secured between said lamp and said mounting ring, a plurality of clamp rods hingedly secured to said mounting ring by one end thereof and having their other ends secured to a clamp plate, a terminal protective cone held in sealing engagement with the reflector portion of the lamp by adjustable pressure applying means engaged in said clamp plate, and electrical conductor means secured in water-tight relation through said protective cone, said conductor means including a grounding wire secured in conducting relationship to said protective cone whereby the external exposed metal parts of said floodlight including the protective grid screen, the mounting ring and the cover plate means are positively grounded.

2. A floodlight as recited in claim 1 wherein there is provided means for permanently securing at least one of said clamp rods to said mounting ring and the other of said clamp rods being removable from engagement with said mounting ring.

3. A floodlight as recited in claim 1 wherein the means for mounting the lamp within the housing includes means for removably securing said mounting ring to said cover plate means.

4. An underwater floodlight comprising a bowl-shaped housing having an open end, cover plate means having an apertured center secured to said housing with a gasket interposed between said cover plate means and said housing, means for mounting a sealed beam reflector type lamp within said housing including a mounting ring engaged with said apertured center, a protective grid screen secured between said lamp and said mounting ring, a terminal protective cone held in sealing engagement with the reflector portion of the lamp by adjustable pressure applying means, and electrical conductor means secured in water-tight relation through said protective cone, said conductor means including a grounding wire secured in conducting relationship to said protective cone whereby the external exposed metal parts of said floodlight including the protective grid screen, the mounting ring and the cover plate means are positively grounded.

5. A floodlight as recited in claim 4 wherein the means for mounting the lamp within the housing includes means for removably securing said mounting ring to said cover plate means.

References Cited by the Examiner
UNITED STATES PATENTS

| | | | |
|---|---|---|---|
| 2,286,448 | 6/1942 | Wahlberg | 240—8.1 X |
| 2,582,659 | 1/1952 | Tamminga | 240—26 X |
| 2,770,714 | 11/1956 | Mead | 240—8.1 |
| 2,935,601 | 5/1960 | Steiner et al. | 240—26 |

NORTON ANSHER, *Primary Examiner.*

C. R. RHODES, *Assistant Examiner.*